United States Patent [19]

McColl

[11] 4,379,635

[45] Apr. 12, 1983

[54] AUTOMATIC APERTURE SIZE MEASUREMENT APPARATUS AND PROCESS

[75] Inventor: James R. McColl, Concord, Mass.

[73] Assignee: GTE Laboratories Incorporated, Waltham, Mass.

[21] Appl. No.: 251,833

[22] Filed: Apr. 7, 1981

[51] Int. Cl.³ ............................................. G01B 11/02
[52] U.S. Cl. .................................. 356/387; 250/237 R
[58] Field of Search ................................. 356/378–380, 356/383–387, 394; 250/237 R

[56] References Cited

U.S. PATENT DOCUMENTS

| 4,070,117 | 1/1978 | Johannsmeier et al. | 356/400 |
| 4,349,278 | 9/1982 | French et al. | 356/384 |
| 4,354,761 | 10/1982 | Jacoby | 356/378 |

OTHER PUBLICATIONS

Ragland, Jr., F. R., "Method of Measuring the Width of Apertures in a PI Shadow Mask", RCA Tech. Note, TN#1231, 9-6-79.

Primary Examiner—William H. Punter
Attorney, Agent, or Firm—John A. Odozynski; Thomas H. Buffton

[57] ABSTRACT

Apparatus for automatically measuring aperture size of a slotted apertured material includes a means for supporting and transporting a slotted apertured material having a plurality of slots with each having a longitudinal axis and a comparator mask overlaying the apertured material and having alternate light transparent and opaque sectors, a light source and a light detector disposed on opposite sides of the slotted apertured material and having a light beam directed therethrough wherein a rhombic-shaped aperture controls the size and shape of the light beam impinging the detector whereby advancement of the rhombic-shaped aperture along a diagonal axis provides a reduced rate of change in light transmitted by the slots and received by the light detector whereby fluctuations in light transmission are reduced for random variations in mask placement.

13 Claims, 6 Drawing Figures

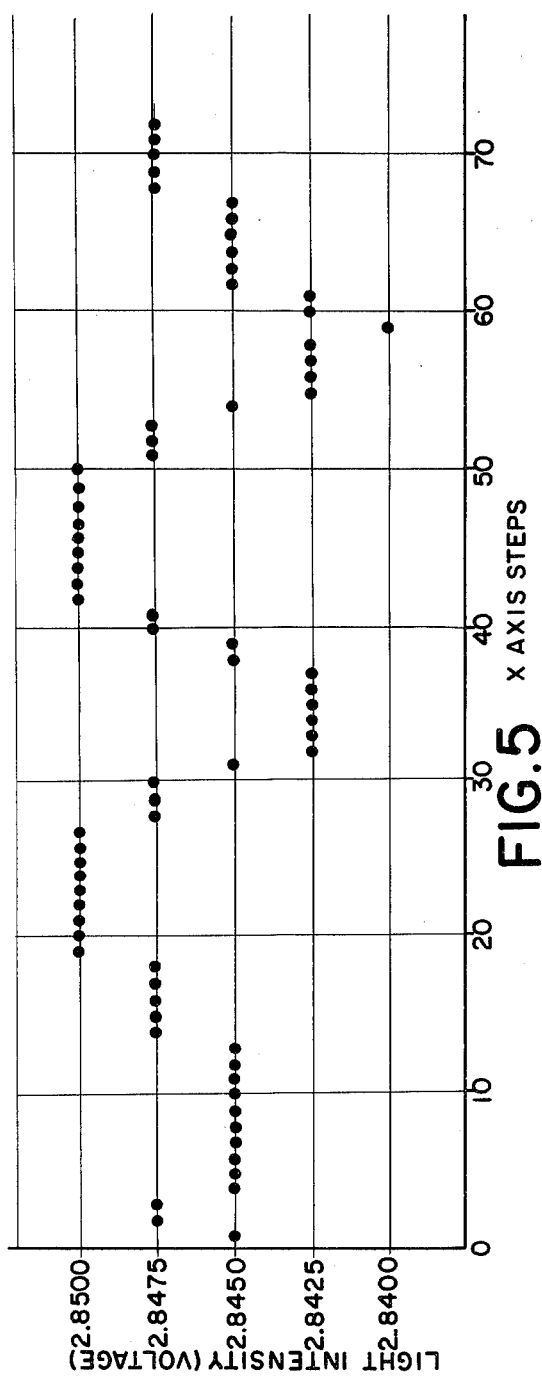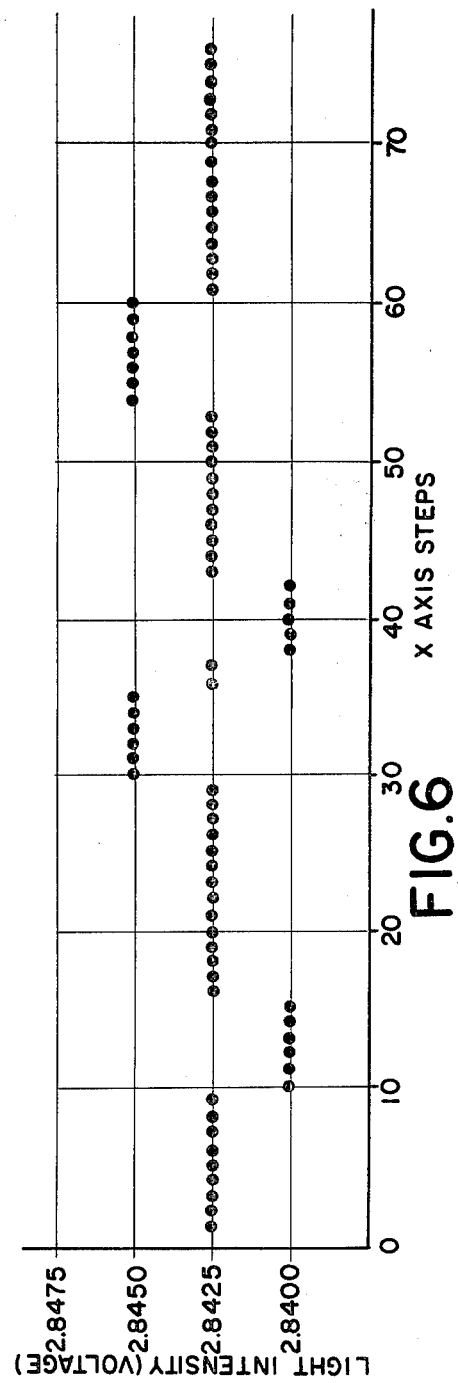

AUTOMATIC APERTURE SIZE MEASUREMENT APPARATUS AND PROCESS

TECHNICAL FIELD

This invention relates to apparatus for automatically measuring apertures in a slotted apertured material and more particularly to apparatus for increasing the uniformity of the rate of change of light passing through the slotted apertured material with variations in placement of the slotted apertured material with a light beam.

CROSS REFERENCE TO RELATED APPLICATIONS

A pending application entitled "Apparatus And Process For Automatically Measuring Aperture Size Of Apertured Material" filed June 9, 1980, bearing U.S. Ser. No. 158,023 and assigned to the Assignee of the present application relates to apparatus for measuring slot width of slotted apertured material. Also, application entitled "Comparator Mask For Aperture Measuring Apparatus" filed June 9, 1980, bearing U.S. Ser. No. 158,024, now U.S. Pat. No. 4,349,278, assigned to the Assignee of the present application relates to a unique comparator mask suitable to the aperture size measurement apparatus of U.S. Ser. No. 158,023.

BACKGROUND ART

Conventional cathode ray tubes suitable to color television include an envelope having a viewing area with an inner surface covered by phosphors to provide a correct color and image rendition when impinged by an electron beam emanating from an electron gun. Disposed intermediate the electron gun and the inner surface of the viewing area is an aperture mask having a plurality of closely spaced apertures. These apertures are of a dimension and configuration such that ideally the electron beam is prohibited from striking phosphors other than those which provide the correct and desired color and image rendition.

Normally, the above-mentioned aperture masks are made from a metallic material, such as steel, and the apertures are effected by way of a well-known photochemical machining process. Also, it has been a common practice to utilize a so-called phosphor-dot type screen wherein the aperture mask included a plurality of substantially circular holes whereby the phosphor dots were deposited onto the inner surface of the viewing area.

Accordingly, the dimensions of the holes and the resultant phosphor dots were critical in order to provide proper impingement of the phosphor dot by an electron beam. To insure the correctness of these critical dimensions, one technique provided a magnification apparatus whereby an inspector visually checked each aperture mask and passed or rejected the part. Obviously, such a technique is not only cumbersome and slow but also subject to operator error and judgement decisions.

Following, it was found that light transmission of the holes in the aperture mask provided information sufficient to accurately determine the hole size. Thus, the undesired relatively slow and relatively inaccurate magnification apparatus employing an operator and relying upon operator judgement was rendered obsolete and a faster more accurate light transmission technique evolved.

However, the phosphor-dot type of cathode ray tube is being rapidly replaced by the so-called "slotted" mask type of cathode ray tube structure. Therein, the apertures are in the form of slots, rather than holes, and the phosphors are in the form of stripes rather than dots. Thus, the new slotted arrangement requires measurements of both slot length and width if correct dimensional configurations are to be determined as compared with the relatively simple prior known holes wherein a single diametrical measurement was sufficient.

In an attempt to provide satisfactory measurements of the so-called "slots", a return was made to the so-called magnification process wherein a microscope and an operator were used to determine one dimension of the slot. Then, light transmission of the total slot was combined with this one microscopic measurement to determine the remaining dimension or width of the slots of the slotted aperture mask.

Although the above-mentioned technique has been and probably still is used with varying degrees of success, it has been found that the results leave much to be desired insofar as both accuracy and measurement efficiency are concerned. More specifically, it has been found that the technique again relies upon relatively inconsistent and inaccurate operator judgement. Moreover, undesired but relatively common variations and rounded ends of the slots render operator judgement and resultant accuracy difficult, if not impossible.

Thereafter, a comparator mask technique was developed as set forth in the above-mentioned co-pending application bearing U.S. Ser. No. 158,023 and incorporated herein by reference. Briefly, a comparator mask of alternate light transparent and opaque sectors is overlayed on a slotted apertured material such that the rounded ends of a number of slots are masked by the opaque sectors of the comparator mask. As a result, a given length of slot is exposed to the transparent sector of the mask and this given length of slot in conjunction with the amount of light passing therethrough, as provided and detected by oppositely disposed light source and light detector means provides signal information sufficient to determine the width of the slots under consideration.

Although the above-described comparator mask technique has provided greatly enhanced results, as compared with other known techniques, it was found that room for improvement still exists. Generally, it was found that an undesired fluctuation in light transmission readings was encountered. In other words, reproducibility of light transmission readings left something to be desired. For example, attempts to repeat a given light transmission reading at a previously designated area resulted in the above-described undesired reading fluctuation.

More specifically, it was discovered that utilizing a light beam which is substantially circular tends to provide a relatively large fluctuation in light transmission readings when an attempt is made to repeat the readings. Although no certainty exists, it is believed that this circular light beam configuration tends to provide a relatively large change in the amount of slot exposure for a small deviation in positioned location of the slotted material with respect to the light beam.

To illustrate, it may be assumed that a slotted apertured material includes a plurality of slots disposed within a substantially square beam of light. With each of the slots having a longitudinal axis extending normal to the one side of the squared beam of light, it can be seen that a slight deviation of the positional location of the light beam and slotted material with respect to one another would result in a relatively large change in light transmission through the slots. In other words, movement therebetween would cause a sudden shift in the number and amount of slots exposed to the relatively square beam of light and as a result, a relatively large and undesired fluctuation in light transmission readings.

SUMMARY OF THE INVENTION

An object of the present invention is to provide improved apparatus for automatically measuring the aperture size of a slotted apertured material. Another object of the invention is to enhance the reproducibility of light transmission readings in automatic aperture size measuring apparatus for slotted apertured material. Still another object of the invention is to provide a relatively uniform rate of change of light transmission through the slots of slotted apertured material in response to uniform movement thereof with respect to a light beam.

These and other objects, advantages and capabilities are achieved in one aspect of the invention by aperture size automatic measuring apparatus for slotted apertured material wherein a slotted apertured material and overlaying comparator mask of alternate opaque and transparent sectors are positioned in a light beam provided by a light source on one side and detected by a light detector on the opposite side with a computer means responsive to the light transmission signal for providing the slot dimension and wherein a rhombic-shaped size control means is positioned in the light beam and moved along a diagonal axis in a direction normal to the longitudinal axis of the aperture slots whereupon fluctuations in light transmission readings are reduced.

BRIEF DESCRIPTION OF THE DRAWINGS

FIG. 5 is a chart illustrating light transmission fluctuations of a prior art substantially circular light beam; and FIG. 6 is a comparison chart illustrating the improved light transmission capabilities utilizing the light beam size control of the invention and a similar area of exposure.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
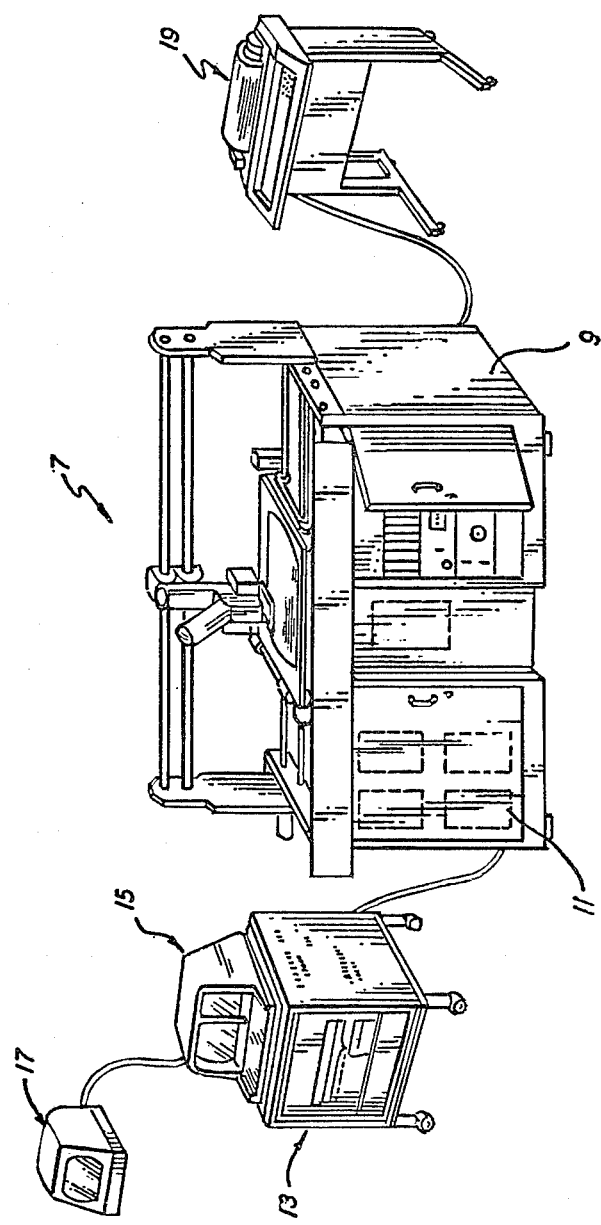
FIG. 1 is a diagrammatic illustration of an apparatus for automatically measuring the aperture size of an apertured material.

Referring to FIG. 1 of the drawings, the apparatus of this disclosure includes a modified densitometer 7 upheld by a substantially desk-size enclosure 9 wherein is disposed a plurality of power supplies and associated driving apparatus 11. A computer 13 and attendent video display terminal 15 are coupled to the power supply and associated apparatus 11 of the modified densitometer 7. Preferably, a remote video display 17 is coupled to the computer 13 while a printer 19 may be associated with the modified densitometer 7.

Figure 2:
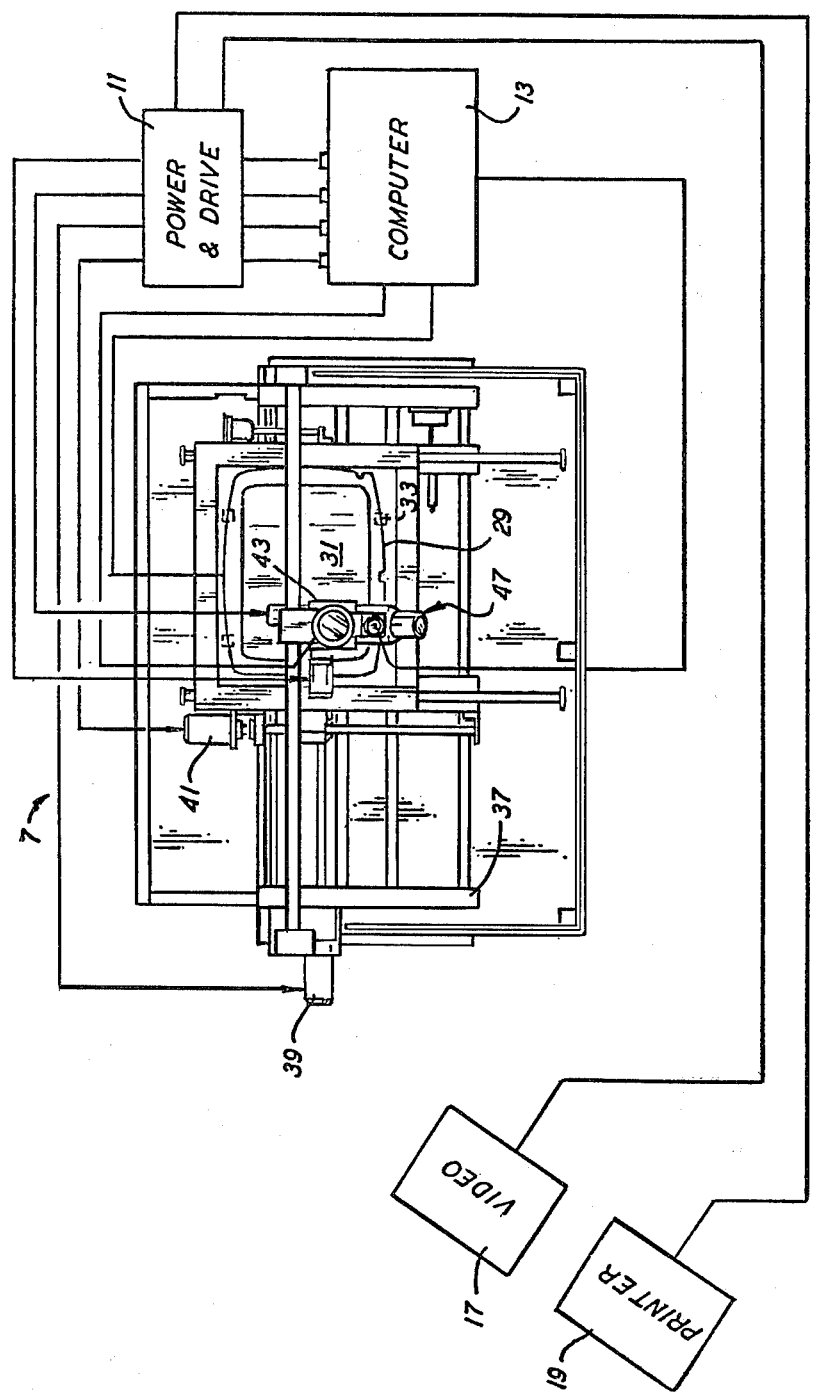
FIG. 2 is a plan view of portions of the apparatus of FIG. 1.
Figure 3:
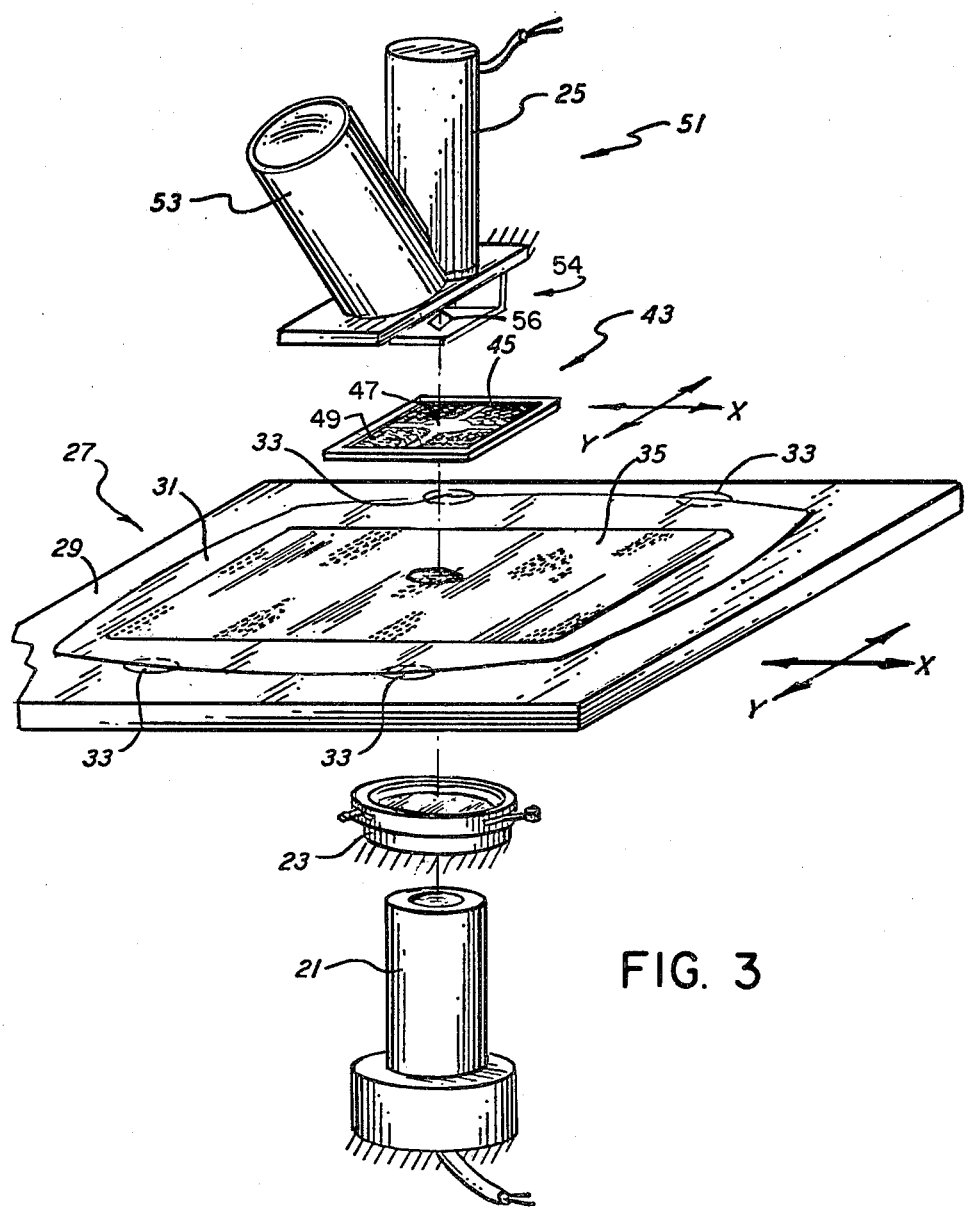
FIG. 3 is an exploded view of the operational components of the apparatus of FIG. 2, illustrating the beam size control means of the invention.

Referring to FIGS. 2 and 3, the modified densitometer 7 includes a light source and collimator 21 and an associated electronic shutter 23 located within the desk-size enclosure 9. This light source and collimator 21 and electronic shutter 23 are coupled and responsive to the power supplies and associated apparatus 11 as well as to the computer 13. Also, a light detector 25 is spaced from and aligned with the light source and collimator 21 and the electronic shutter 23 and coupled to the computer 13.

A first support and transport means for apertured material in the form of an x-y translation stage 27 is disposed immediately adjacent the electronic shutter 23 and positionally locatable in a light beam provided by the light source and collimator 21 and directed to impinge the light detector 25. The first x-y translation stage 27 consists of a contoured frame 29 wherein glass trays 31 of various sizes may be inserted. Preferably, the glass inserts 31 are designed to accommodate cathode ray tube aperture masks having a diagonal measurement in the range of about 10–25 inches.

The contoured frame 29 includes a plurality of magnets 33 which are either manually or computer controlled and serve to affix the metallic apertured material 35, such as an aperture mask for a cathode ray tube, to the contoured frame 29. Also, the contoured frame 29 is movably disposed on a support frame and track assembly 37 having a pair of stepping motors 39 and 41 attached thereto and coupled to the power supplies and associated apparatus connected to the computer 13. Moreover, position displacement transducers (not shown) provide electrical signals to the computer 13 indicative of the positional location of the contoured frame 29.

Mounted above the first support and transport means or first x-y translation stage 27 is a second support and transport means or second x-y translation stage 43. This second x-y translation stage 43 provides support for and movement of a comparator mask 45 disposed thereon. Also, the second x-y translation stage 43 is coupled and responsive to the computer 13 for alignment thereof with the apertured material 35.

Further the comparator mask 45 preferably, but not necessarily, includes a clear or transparent section 47 as well as multiple sections 49 of alternate opaque and transparent sectors with each separate section 49 having opaque and transparent sectors differing in size from the other sections 49. Thus, a section 49 appropriate to the particular spacing of the apertured material 35 at a given location may be selected.

Located above the second support and transport means or second x-y translation stage 43 is a measuring head assembly 51. This measuring head assembly 51 includes the previously mentioned light detector 25 as well as an operator viewing system 53. Preferably, the light detector 25 includes a series of filters and optics for reducing the diameter of a light beam and a silicon detector responsive to the light beam to provide output signals of a magnitude dependent upon the quantity of transmitted light.

Also, the operator viewing system 53 preferably includes a lens and mirror system (not shown) wherein the mirror can be flipped into and out of the light beam.

In this manner, an operator can observe registration of the apertured material 35 and comparator masks 45 without deleterious effect upon the measuring capabilities and reliability of measurement signals provided by the light detector 25.

In accordance with the invention, a light beam size control means 54 has a rhombic-shaped aperture 56 which is located within the light beam intermediate the light source 21 and the light detector 25. This rhombic-shaped aperture 56 has a diagonal axis and is positioned such that the diagonal axis is substantially parallel to the "x-axis" of the above mentioned x-y translation stages 27 and 43 respectively as will be more fully explained hereinafter.

Additionally, a pdp 11 VO3 computer 13 manufactured by the Digital Equipment Company of Maynard, Mass. is programmed and utilized for positional control of the apertured material 35 and comparator mask 45, reception of the resultant optical transmission readings and calculation and provision of signals representative of the aperture size of the apertured material 35. In other words, movement of the first and second x-y translation stages 27 and 43 and operation of the electronic shutter 23 and the light source and collimator 21 as well as safety and limit switches (not shown) in addition to the reception of detected signals representative of optical transmission data and the interpretation of these signals, calculation of signals representative of aperture size and application of these calculated signals to display devices are all provided by the pdp 11 VO3 computer 13.

As to operation, the pdp 11 VO3 computer 13 includes a data file capability wherein each type of apertured material or aperture mask for a cathode ray tube is defined and catagorized. For example, the data file on each type of aperture mask defines a preselected number of positions for optical measurement as well as the expected values and acceptable ranges of percent optical transmission, aperture width and width intermediate the apertures for each positional location. Also, the data file provides for selection of the proper section 49 of the comparator mask 45 at each measurement location. Thus, the operator selects the data file to be utilized for the particular aperture material under consideration.

Also, the computer 13 automatically activates the modified densitometer 7 at the beginning of a measurement procedure to provide a calibration base. Prior to the positioning of the apertured material on the first x-y translation stage 27, a clear transparent area of the comparator mask 45 is positioned in the light beam and the first x-y translation stage 27 automatically moves to each position of measurement indicated in the data file. Thereat, the shutter 23 is opened and closed by the computer 13 and a reading of optical transmission for the open and closed shutter 23 condition at each measurement location is provided by the light detector 25 and coupled to the computer 13. Thus, a 0 and 100 percent optical transmission measurement at each measurement position is stored in the computer for use in optical transmission comparison and aperture dimension calculations.

Having calibrated the apparatus for a particular apertured material or aperture mask 35, an operator positions the apertured material 35 on the contoured frame 29 of the first x-y translation stage 27. Then the magnets 33, which are either permanent or electrically energized, affix the aperture material 35 to the contoured frame 29. With the apertured material 35 firmly affixed, the first x-y translation stage 27 is moved to each preselected measurement position in accordance with preselected programmed signals from the computer 13.

Also, at each of the above-mentioned preselected measurement positions, an alternate transparent and opaque section 49, preselected by the computer 13, of the comparator mask 45 is positionally aligned with the apertured material 35 by the second x-y translation stage 43. In order to achieve the necessary alignment of the comparator mask 45 and apertured material 35, the computer 13 causes the second x-y translation stage 43 to scan in the x and y directions to determine the points of decrease in optical transmission signals as determined by the light detector 25. Upon determination of the drop off or reduction points of optical transmission in each of the x and y directions, the computer 13 calculates the center of the transmission plateau and directs the positioning of the second x-y translation stage 43 to cause centering thereof on the transmission plateau. Thus, the apertures of the apertured material 35 and the passages of the comparator mask 45 are aligned to provide a maximum optical transmission therethrough.

Figure 4:
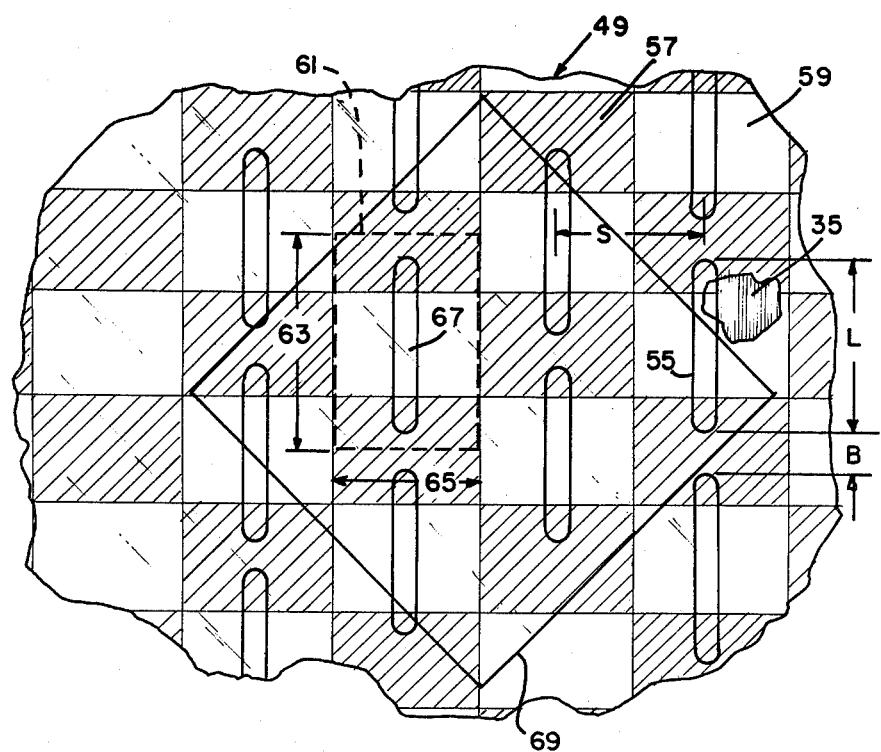
FIG. 4 diagrammatically illustrates a slotted apertured material overlayed by the comparator mask and utilizing the light beam size control means of the invention.

Referring to FIG. 4, an apertured material 35 includes a plurality of spaced slots 55. Also, an overlaying section 49 of a comparator mask 45 includes alternate opaque and transparent sectors, 57 and 59 respectively. Each of the sections 49 of the comparator mask 45 can be divided into what may be termed unit cells 61 with each unit cell 61 including an area equal to the area of a combined opaque and transparent section 57 and 59. More specifically, each unit cell 61 has a vertical dimension 63 equal to the vertical pitch of the slots 55 or the sum of the vertical slot length L and vertical slot spacing B. The unit cell 61 also has a horizontal dimension 65 equal to the horizontal slot pitch or horizontal slot spacing S.

As previously mentioned, the dimensions of the transparent and opaque sectors 57 and 59 of each section 49 of the comparator mask 45 are known and stored in the computer 13. Thus, the computer 13 selects an appropriate section 49 which is overlayed on the apertured material 35. Overlaying the apertured material 35 with the comparator mask 45 in a manner to provide maximum light transmission capability, as previously explained, insures a substantially rectangular-shaped light transmission area 67 wherein the transmission area 67 is a percentage of the unit cell and has one dimension substantially equal to the dimension of a transparent sector 59 which is known. Thus, the light transmission of the combined aperture mask and the overlayed comparator mask can be equated to the area of the rectangular shaped light transmission area 67 and may be utilized in conjunction with known dimensions of the unit cell and comparator mask overlay to derive a signal proportional to the width of slot 55.

Thereafter, signals representative of slot width are easily distributed to a visual display terminal 15 and to a remote video display 17 which may be located in the area of manufacture whereby undesired variations in manufacture may be noted and corrected without undue delay. Also, a printer 19 may be employed should a printed record be desirable.

Additionally, the provision of a light beam size control means 54 of FIG. 3 having a rhombic-shaped aperture 56, illustrated as a diamond-shaped aperture 69 of FIG. 4 serves to limit the area of the slotted apertured material 35 and comparator mask 45 exposed to the light detector 25 of FIG. 3. The diamond-shaped aperture 69 is aligned such that a diagonal axis thereof is in a direction normal to the direction of the longitudinal axis of the space slots 55 of the slotted apertured material 35. Thus, movement of the diamond-shaped aperture 69 and slotted aperture material 35 with respect to one another along the diagonal axis of the diamond-shaped aperture 69 tends to produce a reduced rate of change in slot exposure with each movement as compared with prior known techniques. As a result, undesired fluctuations in light transmission readings are reduced upon random variation between comparator mask and slotted apertured material within the optical system.

As a specific example of the reduced reading fluctuations, a prior art apertured size control means having a substantially circular aperture for controlling the light beam impinging the light detector 25 was moved in steps in a plane substantially normal to the longitudinal axis of a plurality of slots 55. As can be seen in the diagram of FIG. 5, voltage readings of the resultant light transmission indicate relatively substantial fluctuations.

In contrast, FIG. 6 illustrates a size control means having a substantially diamond-shaped aperture, of the same area as the circular aperture, for controlling light impinging a light detector 25 herein. As can be seen, fluctuations in the light transmission are considerably reduced when a substantially diamond-shaped aperture is moved in a direction along the diagonal axis thereof and normal to the longitudinal axis of the slots 55.

While there has been shown and described what is at present considered the preferred embodiments of the invention, it will be obvious to those skilled in the art that various changes and modifications may be made therein without departing from the scope of the invention as defined by the appended claims.

INDUSTRIAL APPLICABILITY

Thus, apparatus for automatically measuring aperture size of apertured material has been provided. The apparatus utilizes a comparator mask in conjunction with a light source and light detector to provide signals to a computer whereby aperture size of the apertured material is determined and a signal representative thereof applied to a video display or printer. The apertured material and comparator mask are both positionally located in a light beam in accordance with a preselected program and provide rapid measurements of aperture size independent of operator judgement.

Also, a size control for the light beam is provided wherein the light beam received by a light detector is restricted to a rhombic configuration. Moreover, this restricted rhombic-shaped light beam lowers the rate of change in exposure of the slots of a slotted apertured material when moved along the diagonal axis of the rhombic-shaped aperture and normal to the longitudinal axis of the slots of the slotted apertured material.

I claim:

1. In apparatus for automatically measuring aperture size of a slotted apertured material having a plurality of slots each with a longitudinal axis, a comparator mask means overlaying the slotted apertured material, a light source and light detector positioned on opposite sides of said comparator mask means and slotted apertured material and providing a light beam for passage therethrough and a computer means coupled to the slotted apertured material and comparator mask means and responsive to a signal from said light detector representing light transmission of the slots, the improvement comprising a light-beam size control means including a rhombic-shaped aperture having a diagonal axis substantially normal to said longitudinal axis of said slots whereby substantially uniform movement of said slotted apertured material and comparator mask means and said light beam size control means with respect to one another along said diagonal axis provides a relatively uniform rate of change of light passing through said slots.

2. In the apparatus of claim 1, the improvement wherein said size control means includes a diamond-shaped aperture having a diagonal axis substantially normal to said longitudinal axis of said slots.

3. In the apparatus of claim 1, the improvement wherein said size control means includes a square-shaped aperture having a diagonal axis substantially normal to the longitudinal axis of said slots.

4. In the apparatus of claim 1, the improvement wherein said light-beam size control means is disposed intermediate said light source and said light detector.

5. In the apparatus of claim 1, the improvement wherein said light-beam size control means is positionally located intermediate said light detector and said comparator mask means within said light beam.

6. Apparatus for automatically measuring aperture size of a slotted apertured material having a plurality of slots each having a longitudinal axis including a comparator mask means having a plurality of alternate light transparent and opaque sectors, means for supporting and transporting said slotted apertured material and comparator mask means, means disposed on opposite sides of said slotted apertured material and comparator mask means for providing and detecting a light beam directed to pass therethrough, and a computer means coupled to said means for supporting and transporting said slotted apertured material and said comparator mask means and responsive to said means for detecting said light beam for providing a signal representing light transmission of said slots, said apparatus characterized by the improvement of a size control means having a rhombic-shaped aperture with a diagonal axis disposed within said light beam with said aperture and said slotted apertured material and said comparator mask means movable with respect to one another along said diagonal axis whereby the rate of change of light passing through said slots is relatively uniform with diagonal movement uniformity.

7. The apparatus of claim 6 wherein said aperture of said size control means is in the form of a diamond having a diagonal axis substantially normal to the longitudinal axis of said slots.

8. The apparatus of claim 6 wherein said aperture of said size control means is in the form of a square having a diagonal axis substantially normal to the longitudinal axis of said slots.

9. In a process for automatically measuring aperture size of a slotted apertured material having a plurality of slots each having a longitudinal axis including the steps of ovelaying said slotted apertured material with a comparator mask having a plurality of alternately spaced light transparent and opaque sectors; positioning a light source and a light detector on opposite sides of said slotted apertured material and overlaying comparator mask to provide a light beam directed therethrough and utilizing light transmitted through said slotted apertured material and comparator mask to provide a detected signal for calculating the width of said slotted apertured material, said process characterized by the improvement including the step of restricting said light beam impinging said light detector to a rhombic-shaped configuration having a diagonal axis normal to said longitudinal axis of said slots to provide a relatively uniform rate of change of light transmission with movement of said slotted apertured material and said light beam with respect to one another along said diagonal axis.

10. The process of claim 9 wherein said light beam impinging said light detector is restricted to a substantially diamond-shaped configuration having a diagonal axis normal to said longitudinal axis of said slots.

11. The process of claim 9 wherein said light beam impinging said light detector is restricted to a substantially square configuration having a diagonal axis normal to said longitudinal axis of said slots.

12. The process of claim 9 wherein said restricting of said light beam impinging said light detector is effected intermediate said light source and said light detector.

13. The process of claim 9 wherein said restricting of said light beam impinging said light detector is effected intermediate said comparator mask and said light detector.

* * * * *